(12) United States Patent
Lukesova et al.

(10) Patent No.: US 8,975,355 B2
(45) Date of Patent: Mar. 10, 2015

(54) ULTRA-HIGH MOLECULAR WEIGHT POLYETHYLENE

(75) Inventors: Lenka Lukesova, Hofheim/Ts (DE); Lars Kölling, Mannheim (DE); Shahram Mihan, Bad Soden/T.S. (DE)

(73) Assignee: Basell Polyolefine GmbH, Wesseling (DE)

( * ) Notice: Subject to any disclaimer, the term of this patent is extended or adjusted under 35 U.S.C. 154(b) by 440 days.

(21) Appl. No.: 13/521,720

(22) PCT Filed: Jan. 24, 2011

(86) PCT No.: PCT/EP2011/000282
§ 371 (c)(1),
(2), (4) Date: Jul. 11, 2012

(87) PCT Pub. No.: WO2011/089017
PCT Pub. Date: Jul. 28, 2011

(65) Prior Publication Data
US 2012/0289667 A1    Nov. 15, 2012

(30) Foreign Application Priority Data

Jan. 22, 2010 (EP) .................................. 10000668

(51) Int. Cl.
*C08F 110/02* (2006.01)
*C08F 10/00* (2006.01)
*C08F 4/58* (2006.01)
*C08F 4/52* (2006.01)
*C08F 4/76* (2006.01)
*C08F 4/6392* (2006.01)
*C08F 4/659* (2006.01)
*C08F 4/6592* (2006.01)

(52) U.S. Cl.
CPC . *C08F 10/00* (2013.01); *C08F 4/58* (2013.01); *C08F 2500/01* (2013.01); *C08F 2500/12* (2013.01); *C08F 4/52* (2013.01); *C08F 4/76* (2013.01); *C08F 4/6392* (2013.01); *C08F 4/65912* (2013.01); *C08F 4/65916* (2013.01); *C08F 4/65925* (2013.01); *C08F 110/02* (2013.01); *C08F 2420/01* (2013.01)
USPC ............................ 526/352; 526/170; 526/192

(58) Field of Classification Search
USPC ........................................ 526/170, 192, 352
See application file for complete search history.

(56) References Cited

U.S. PATENT DOCUMENTS 3,882,096 A    5/1975    Shida et al.
5,587,440 A    12/1996    Ehlers et al.

FOREIGN PATENT DOCUMENTS

| EP | 0501672 | 9/1992 |
|----|---------|--------|
| WO | WO-9820054 | 5/1998 |
| WO | WO-2006052232 | 5/2006 |

*Primary Examiner* — Richard A Huhn

(57) ABSTRACT

A novel UHMW polyethylene material, which is displaying excellent abrasion resistance amongst other properties, is devised.

17 Claims, No Drawings

ULTRA-HIGH MOLECULAR WEIGHT POLYETHYLENE

This application is the U.S. national phase of International Application PCT/EP2011/000282, filed Jan. 24, 2011, claiming priority to European Application 10000668.3 filed Jan. 22, 2010; the disclosures of International Application PCT/EP2011/000282 and European Application 10000668.3, each as filed, are incorporated herein by reference.

The present invention relates to a novel ultrahigh molecular weight polyethylene. The new polymer excels by virtue of its high abrasison resistance.

Ultra high molecular mass polyethylene (UHMW-PE) is the usual designation for a group of linear polymers containing predominantly ethylene units in which the polymers have a weight average molecular weight of about 1 to $1.5 \cdot 10^6$ g/mol or even higher. Such polymers are well known in the art for their high impact strength and their high abrasion resistance, rendering them superior for uses for which lower molecular mass polyethylene is less suitable due to its poor mechanical properties. Especially, the ultra high molecular mass polyethylene is available for making gears, bearings, guide rails, and slider beds in conveyors and other similar articles. UHMWPE is the toughtest of all plastics, in fact. In industry standard abrasion tests, UHMWPE may exhibit about 10 times the abrasion resistance of carbon steel. That is 3 times more than the toughest elastomer, polyurethane, and about 80 times that of hard neoprene rubber. Of course, UHMWPE is a rigid, stiff material. Those grades exhibiting hightest abrasion resistance are not found processable by standard extrusion equipment, and require special techniques (ram-extrusion). Also, standard analytics for PE are not applicable any more to those extremely rigid, highly abrasion resistant UHMWPE grades. For instance, high temperature GPC analysis in trichlorobenzene for analyzing mass distribution of PE is not applicable to said UHMWPE grades any more.

Ultra high molecular mass polyethylene is described in U.S. Pat. No. 3,882,096. Such prior art reference describes a mixed chromium/titanium catalyst and the preparation of the polymer in its presence under costumary polymerization conditions. The polymers described by the reference have a molecular mass of up to $3 \cdot 10^6$ g/mol.

WO98/20054 describes a gas phase fluidized bed polymerization process and the preparation of ultra high molecular weight polyethylene in the presence of a chromocene catalyst sitting on a thermally activated silica support material. The polyethylene prepared along that polymerization have a density in the range of from 0.929 to 0.936 g/cm³ and a mean particle size of from 0.7 to 1 mm.

Several other publications such as EP-A-0 645 403 describe ultra high molecular mass polyethylene prepared in the presence of Ziegler catalyst. The polymer prepared thereby has a mean particle size of about 0.2 mm or less and a bulk density of from 350 to 460 g/l.

The prior art suffered from problems of combining appreciable abrasion resistance with other properties such a average grain size of reactor product, impact resistance or density range achievable.

It is the object of the present invention to devise a novel UHMW-PE of about medium density having superior abrasion resistance, preferably combined with a superior Charpy impact resistance. Further, due to its limited processability, the product should be of sufficient average grain size when exiting the reactor, which aspect is intimately linked to the specific productivity of the catalysts employed, and the mode of reactor operation feasible therewith, respectively.

This problem was solved by using two different catalysts of the metallocene-type for producing the UHMW PE as a reactor blend, and the novel PE comprising suitable bimetallic catalyst residue accordingly.

According to the present invention, a Polyethylene is devised having an HLMI (at 21.6 kg/190° C.) of <1 g/10 min., a density of from 0.925 to 0.940 g/cm³, preferably of from 0.928 to 0.938 g/cm³, most preferably of from 0.930 to 0.936 g/cm³, and which polyethylene has a Charpy impact resistance according to ISO 11542-2:1998, of >150 kJ/m², has an abrasion resistance of <1.1 index units according to ISO 15527:2007 with $Al_2O_3$ being used as testing abrasive, as is further described in the experimental section. The exact test conditions for the abrasion resistance are given in the experimental section. Said polyethylene is further comprising both Hf and Cr as a catalyst residue, preferably with the proviso that the Cr catalyst is not comprised in oxidic form in the polyethylene. The latter excludes catalyst residue of a Phillips catalyst from further consideration. The term 'as a catalyst residue' means that they are effectively present beyond the generally recognized level of trace impurities for such metals, especially Cr, which is known to be a prominent constitutent amongst trace metals. The metals will be typically present as a ionic compound such as a salt or as metal complex of any kind. Usually and preferably, the Hf and Cr, in the context of the invention, stems preferably from single site catalyst of the metallocene and/or half-sandwich metallocene type comprising organic, multidentate ligands. It should also be understood that Hafnium salts as used for preparation of Hafnocenes often comprise some amount of Zirconium, due to mixed ores they are originally extracted from. Hence the possible further presence of Zr in such polyethylene samples is not contrary to a finding of simultaneously detectable Hf being a catalyst residue. In the UHMW product, it is unlikely to detect the original catalyst complexes in intact form, hence for the purpose of the present invention, analysis is done only but to identify and distinguish qualitatively or semi-quantitatively from general level of trace impurities the above said two Hf- and Cr-metal centers of the original catalyst complexes. Suitably, in the context of the present invention, such is done by either TOF(time of flight)-mass spectroscopy or by atomic absorption spectroscopy (AAS) in a graphite pipe oven, e.g. suitably equipped with a sample carrier for solid material according to L'vov. AAS must be conducted with proper adjustment of the cathodic lamps for the specific absorption wave lengths of Hf and Cr, respectively, and preferably under reducing conditions such as e.g. adding nitrous oxide to the carrier gas. The methodoloy is well known to the skilled person. TOF mass spectroscopy should be carried out with field desorption (FD) or matrix assisted laser desorption (MALDI) ionization, given the solid character of the sample. Prior to analysis, a sample of the UHMW polyethylene should be heated above its melting point, to allow of some homogenization of softened material. Both methods will usually dissociate the multiple molecular species such as organometal complexes of any kind or plain salts and allow of uniform separation and detection signal for the free metal atoms or free ions, harbored in the polymer. TOF-Mass spectroscopy is a preferred method. It should be realized that methods for direct analysis of solid materials, such as SIMS mass spectroscopy, are not suitable for the present purpose since resin particles as obtained from polymerization might not comprise solid supported catalyst particles in an evenly distributed form, in particular not close to the surface of said resin particle.

Solid oxides are typically found to be refractory to above methods but are believed not to ensue from use of afore said catalysts according to the invention, and hence are not be considered preferably. The analytical methods allow of quantifying the relative amounts of Hf or Cr as found in the polymer, especially when using mass spectroscopy in conjunction with reference mixtures of Hf and Cr salts or complexes for calibration. Preferably, the polyethylene of the invention comprises Hf and Cr in a molar ratio [Hf]:[Cr] of from 30-80 µmol:70-20 µmol, more preferably in a molar ratio of from 40-55 µmol:40-25 µmol, most preferably in a molar ratio of from 45-50 µmol:35-30 µmol. A molar ratio [Hf]:[Cr] of from 30-80 µmol:70-20 µmol means a molar ratio of [Hf]:[Cr] of from 1:2,3 up to 4:1 in the present context; that is, the ratio values are normalized to 100 µmol total catalyst used.

Further preferred, the polyethylene of the invention comprises at least 1 ppm of each Hf and/or Cr, which are preferably present in cationic form, which may be a salt or any organometal complex or compound optionally including anorganic anions, preferably are present as cationic complexes with multidentate organic ligands comprising η-5-cyclopentadienyl (Cpd) moieties. Moieties in this context relates to any aromatic or heteroaromatic radical, such as e.g. indenyl, constituting the functional equivalent of a η-5-cyclopentadienyl (Cpd) radical.

Further preferred the polyethylene, alone or in conjunction with what said in the preceding paragraph, the polyethylene is comprising up to 200 ppm of each Hf and/or Cr, more preferably of from 2 to 150 ppm of each Hf and/or Cr, most preferably of from 5 to 100 ppm of each Hf and/or Cr.

Preferably the catalyst residue is co-localized within the polyethylene to granular inclusions of a solid, refractory support material, more preferably a metal oxide, and preferably with the proviso that a said support material of the Cr catalyst is not an alumosilicate. It is possible, as has been done e.g. for analysing white spots or gels in polymer blends, to mechanically dissect granular inclusions from the polyethylene, identifyable by way of using microtome slices of up to 50 um, usually less than 30 um and analyzing them visually under a light microscope. Such samples mostly consisting of such granular inclusion and some peripherally attached polymer matrix may then preferably be used for further analysis by mass spectroscopy or AAS, as explained above in more detail. More preferably the Cr catalyst or the support of said Cr catalyst giving rise to the Cr catalyst residue was not subjected to a fluorinating treatment.

Preferably, the polyethylene of the invention has an HLMI of <0.01 g/10 min.

Preferably, alone or in conjunction with any of the further features of the polyethylene of the invention as described below or above, the polyethylene has a Charpy impact resistance of >160 kJ/m$^2$, preferably of at least 170 kJ/m$^2$.

Further preferred, no polyunsaturated monomer or comonomer was added to the polyethylene as a crosslinker during polymerization from which the polyethylene was obtained, and further wherein the polyethylene has not been subject of a post-polymerisation electronbeam treatment, for crosslinking of the polymer chains.

The polyethylene of the present invention is a UHMW polyethylene, hence it has no substantive extrudability with standard extrusion equipment as used for blow moulding or film blowing, as is indicated by its extremly HLMI as cited above. For the same reason, the polyethylene is not amenable to standard high temperature GPC analysis in trichlorobenzene as is routinely used for mass distribution analysis and for experimental determination of Mw, Mn. Unlike most thermoplastics, UHMW PE does not liquify when heated above its melting point. Because of its high melt strength, it can be handled and shaped above its crystalline melting temperature. Conceptually, due to afore said properties as UHMW PE of poor extrudability and little standard melt index value, it may be safely concluded that as a further preferred feature the polyethylene of the invention has at the very least a theoretical weight average Molecular weight, Mw, of >1.5 million Da. It may be mentioned that UHMWPE may of course be extruded, though by special techniques such as RAM-extrusion only.

EXPERIMENTS

The density [g/cm$^3$] was determined in accordance with ISO 1183.

The Melt Flow Rate was determined at 190° C. under a load of 21.6 kg (190° C./21.6 kg) in accordance with ISO 1133.

Charpy impact resistance was determined according to ISO 11542-2:1998, cf. esp. appendix B. The sample was produced by compression moulding as described in sections 3-5 of the main text.

The abrasion resistance was determined essentially according to ISO 15527:2007 with Corundum, that is Al$_2$O$_3$ (of the grain size indicated in the standard) being used as testing abrasive. The following modified conditions (in accordance with commonly accepted industry standard): Abrasion was tested at 1750 rpm for 2 hours using a slurry of 60%(w/w) aluminium oxide and 40% (w/w) water (aqua dest.). Result is calculated, as described in the ISO standard again, based on relative mass loss comparison, using an identical sample for reference which sample was treated in the same way but in the absence of aluminium oxide when submerged in water during testing. A lower number indicates better abrasion resistance, since less mass was abrasively lost relative to reference sample.

Catalyst 1:

Bis(n-butyl-cyclopentadienyl)hafnium dichloride is commercially available from Chemtura Inc.

Catalyst 2:

η$^5$-[2-((3-trimethylsilyl-1H-inden-1-yl)methyl)pyridinyl]chromium(IV)chloride

For analogous compounds, synthetic protocol is provided for in WO 01/12641.

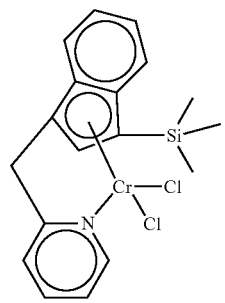

Support Pretreatment:

XPO-2408, a spray-dried silica gel from Grace (Grace & Co. Columbia/Maryland, U.S.A.), was calcined at 600° C. for 6 hours and subsequently 2.5 Kg of the dried silica gel were put into a 10 L vessel and cooled at 10° c.

Co-Supportation:

9.9 g of calcinated (6 h, 600° C.) Silicagel XPO 2408 were placed in a 250 ml round bottom flask and cooled down to 0° C. Cr Complex catalyst 2 (123 mg, 305.7 µmol) and Hf complex catalyst 1 (243 mg, 494 µmol) were dissolved in MAO (16.8 ml, 79.97 mmol, 30% in Toluene, 4.75 mol/l) and stirred for 20 min at ambient temperature (22° C.).

The MAO solution was added dropwise to the cooled silica within 5 min at 0° C. After that the powder was stirred for 1 h and allowed to reach ambient temperature. 60 ml of n-heptane were added in two portions, while stirring continued for 1 min. The catalyst powder was dried for 1 h by continuously passing through a stream of Ar. 15.2 g of a light green, free flowing powder were obtained.

Polymerisation (Invention)

4 L isobutane were loaded in a 10 L autoclave reactor under nitrogene. The reactor headspace was purged with nitrogen which was consecutively removed by flashing with about 2 reactor volumes of ethylene. Then the reactor was pressurized at 40 bar with ethylene, essentially prior to starting the reaction. 155 g co-supported catalyst as prepared in the preceding section, amounting to 50 umol of the Hafnocene and 30 umol of the Cr-catalyst, were fed to the reactor through a feeding valve. Catalyst feed was started with after passing a pressurization of 35 bar, and was completed when reaching the final pressure of 40 bar. Reaction was carried out under stirring for 1 h at 70° C. Yield was 10 Kg polyethylene polymer/g supported catalyst.

Polymerisation

Comparative Example A, B

In an analogous manner, the polymerisation was conducted with only either one of the complex catalysts carried on the support, as indicated in the table below. Results of the Polymerisations both from the invention and the comparative examples are shown in table I below:

TABLE I

|   | [Hf] µmol | [Cr] µmol | Time [h] | p [bar] | T [° C.] | Productivity [g PE per g supported catalyst] | Abrasion Al2O3 | Charpy @ 23° C. [kJ/m2] | Density [g/cm3] | Average grain size of resin (sieving size distribution analysis) [mm] |
|---|---|---|---|---|---|---|---|---|---|---|
| Comp. A | 60 | — | 1 | 40 | 70 | 9500 | 1.14 | 149 | 0.935 | 0.88 |
| Comp. B | — | 75 | 1 | 40 | 70 | 4300 | <1 | 44 | 0.923 | 1.22 |
| Invention | 50 | 30 | 1 | 40 | 70 | 10000 | 1.01 | 187 | 0.931 | 1.01 |

As can be inferred from the table above, the hybrid UHM-WPE devised by using the dual catalyst system of the invention retains the respective best properties of every individual catalyst. It retains the excellent abrasion resistance of the Chromium catalyst (which is superior to that of the Hafnocene catalyst) though being at a higher density, comparable to that of the Hafnocene, and vice versa, selectively retains and even trespasses the much superior Charpy properties of the isolated Hafnocene product. There clearly is a synergistic effect taking place, which is not yet fully understood by us. From both catalysts, the product retains the respective better property and even improves on such, upon combination of the respective catalysts for yield one single product. Likewise, the product has a superior average grain size of at least 1 mm, which is technically desirable and indeed here is a half-way compromise in between the respective catalysts' typical average, under the ever same reaction condition. Nonetheless, as regards the mechanical properties, the product is a selective and surprising combination of excellent abrasion and Charpy impact resistance.

The invention claimed is:

1. A polyethylene having an HLMI (at 21.6 kg/190° C.) of <1 g/10 min, a density of from 0.925 to 0.940 g/cm$^3$, a Charpy impact resistance according to ISO 11542-2:1998, of >150 kJ/m$^2$, an abrasion resistance of <1.1 index units according to ISO 15527:2007 with Al$_2$O$_3$ being used as testing abrasive, wherein the polyethylene comprises both Hf and Cr as a catalyst residue.

2. The polyethylene of claim 1, comprising both Hf and Cr as the catalyst residue in a molar ratio [Hf]:[Cr] of from 30-80 µmol:70-20 µmol.

3. The polyethylene of claim 1, comprising at least 1 ppm of each Hf and/or Cr, which are present in cationic form, wherein the polyethylene comprises up to 200 ppm of each Hf and/or Cr.

4. The polyethylene of claim 1, wherein the catalyst residue is co-localized within the polyethylene to granular inclusions of a solid, refractory support material.

5. The polyethylene of claim 1 wherein a Cr catalyst or the support of said Cr catalyst giving rise to the Cr catalyst residue was not subjected to a fluorinating treatment.

6. The polyethylene of claim 1 having an HLMI of <0.01 g/10 min.

7. The polyethylene according to claim 1 having a Charpy impact resistance of >160 kJ/m$^2$.

8. The polyethylene according to claim 1 wherein no polyunsaturated monomer or comonomer was added as a crosslinker during polymerization from which the polyethylene was obtained, and wherein the polyethylene has not been subject of a post-polymerisation electronbeam treatment, for crosslinking of the polymer chains.

9. The polyethylene of claim 1 prepared by a metallocene or half-sandwich metallocene catalyst.

10. The polyethylene of claim 1 wherein the Cr catalyst residue is from a catalyst other than a Phillips catalyst.

11. The polyethylene of claim 3 wherein each of the Hf and/or Cr are present as cationic complexes with multidentate organic ligands comprising η-5-cyclopentadienyl moieties.

12. The polyethylene of claim 1 wherein the polyethylene comprises up to 200 ppm of each Hf and/or Cr.

13. The polyethylene of claim 12 wherein each of the Hf and/or Cr are present in an amount of from 2 to 150 ppm.

14. The polyethylene of claim 13 wherein each of the Hf and/or Cr are present in an amount from 5 to 100 ppm.

15. The polyethylene of claim 4 wherein the solid refractory support material is a metal oxide.

16. The polyethylene of claim 15 wherein the support material of the Cr catalyst is not an alumosilicate.

17. The polyethylene according to claim 7 wherein the polyethylene has a Charpy impact of at least 170 kJ/m$^2$.

* * * * *